Jan. 4, 1944.                F. A. BUZZELL                 2,338,316
         INSULATING BUSHING FOR ELECTRICAL CONDUITS AND THE LIKE
                          Filed July 5, 1941

Inventor:
Francis A. Buzzell,
By Dawson, Ooms & Booth,
          Attys.

Patented Jan. 4, 1944

2,338,316

UNITED STATES PATENT OFFICE 2,338,316

INSULATING BUSHING FOR ELECTRICAL CONDUITS AND THE LIKE

Francis Allen Buzzell, Chicago, Ill.

Application July 5, 1941, Serial No. 401,100

3 Claims. (Cl. 174—83)

This invention relates to an insulating bushing for electrical conduits and the like and more particularly to a bushing designed to protect and insulate wires for electrical connections which extend from the ends of conduits.

An object of the invention is to provide a bushing of insulating material adapted to be secured to the end of a conduit to protect and insulate the wires extending therefrom. Another object is to provide a bushing which may be fitted into the end of an electrical conduit, the bushing being equipped with a flange which covers the end of the conduit and which is turned back upon itself to form a channel within which the end of the conduit is received. Still another object is to provide a bushing which includes a tubular body and an outer extending end flange which threadedly engages the conduit.

Yet another object of the invention is to provide a bushing for electrical conduits made of resinous material and equipped with threads for engaging the conduit and securing the same to a wall or outlet box or the like. Another object is to provide a resilient insulating bushing which serves to cushion the wires in the conduit at the end of the same and to insulate the wires from the conduit. A further object is to provide a resilient bushing equipped with a flange which is turned back upon the body of the bushing to form a channel which decreases in thickness away from the end of the bushing and which serves to resiliently grip an electrical conduit which is inserted into the channel.

Other features and advantages will appear from the following specification and drawing in which—

Figure 1:
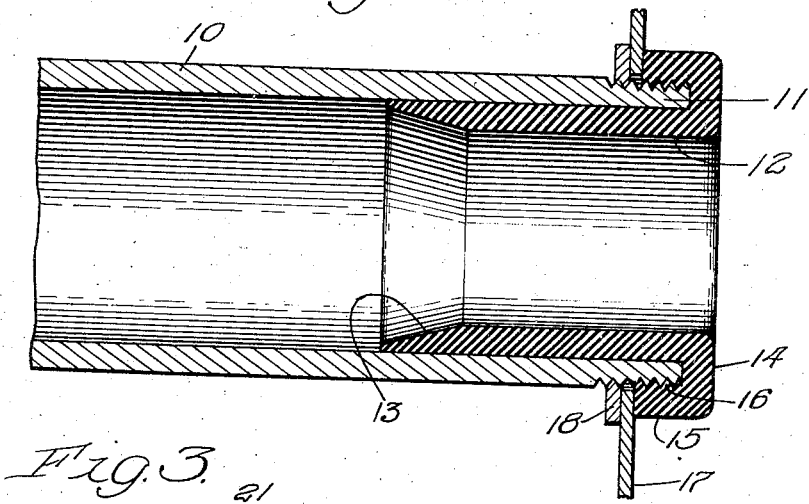
Figure 3:
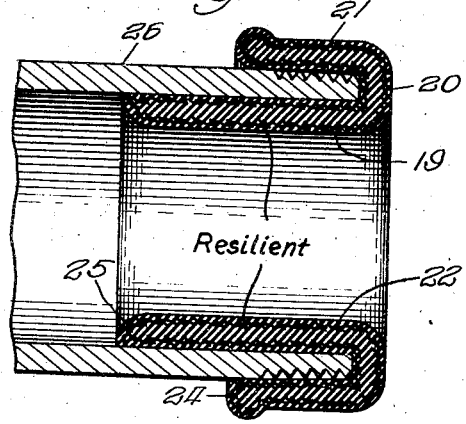
Figure 2:
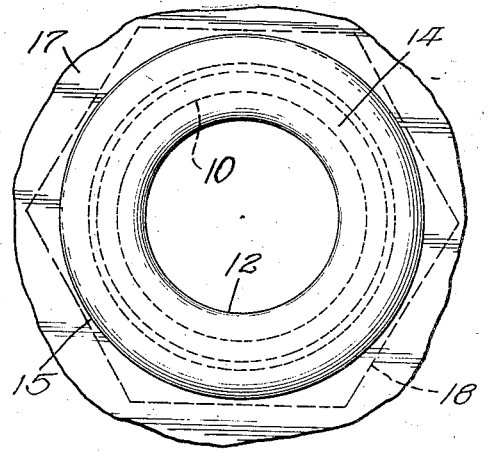
Figure 4:
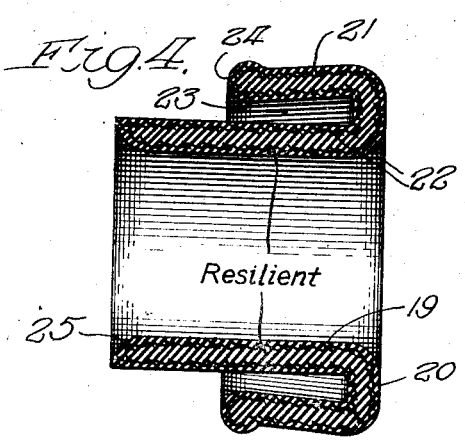

Figure 1 is a longitudinal sectional view of an embodiment of the invention mounted on an electrical conduit; Fig. 2 is an end elevational view of the same; Fig. 3 is a longitudinal sectional view of a modification of the bushing as applied to a conduit; and Fig. 4 is a longitudinal sectional view of the same modification after removal from the conduit.

In the embodiment of the invention described herein, the bushing is adapted to be applied to an electrical conduit 10 of the usual type which may be equipped with a threaded portion 11 on the outer periphery of one end thereof.

The bushing may be made of any suitable insulating material. As shown in Figs. 1 and 2, the bushing includes a tubular body 12 of a resinous insulating material. The resinous material may be any suitable synthetic or natural resin or plastic which is an electrical insulator. As shown, the tubular body 12 is preferably cylindrical in shape and is equipped at one end with an outwardly tapered inner wall 13.

The other end of the body 12 is turned outwardly to form an outwardly extending annular flange 14. The flange 14 in turn is bent backwardly upon the body of the bushing to form the annular ring 15 extending about the body 12 of the bushing and spaced therefrom. The inner periphery of the ring 15 may be provided with threads 16 by means of which the bushing is brought into threaded engagement with the conduit. The ring 15 should be spaced from the body 12 by a distance substantially equal to the thickness of the electrical conduit to which the bushing is to be applied.

The ring 15 and the flange 14, may, as shown, be integral with the body 12 of the bushing. On the other hand, if desired, either of these parts may be separately made and secured to the body of the bushing. In any event, all of the parts should be of insulating material.

The bushing may be applied to the electrical conduit in such a manner as to secure it to the wall 17 of an outlet box or the like. A threaded nut or washer 18 is applied to the threaded portion 11 of the conduit on one side of the wall 17. The bushing is then applied to the conduit and the threaded portion 16 is tightened on the conduit until the ring 15 of the bushing is brought into engagement with the wall 17.

In the modification of the invention shown in Figs. 3 and 4, the bushing is equipped with a tubular body 19 of rubber or other flexible resilient material. The body 19 is turned outwardly at one end to form an end flange 20, the flange 20 being turned backwardly upon the body at the outer periphery of the flange to form a ring 21. The ring 21 extends about the body 19 and is spaced therefrom preferably by a distance substantially equal to the thickness of the conduit to which the bushing is to be applied.

If desired, the resilient material of the bushing may be provided with reinforcing fabric strips 22 which strengthen and toughen the material. The fabric may be in the form of cord of the type normally used in reinforcing rubber and other resilient materials.

The ring 21 which is turned backwardly upon the body 19 of the bushing is preferably spaced from the body 19 by a greater distance at the portion of the ring which is adjacent the flange 20. The ring 21 thus provides a channel 23 which is annular in shape and is of greater width at the portion thereof adjacent the flange 20. Preferably the width of the channel 23 at a point adjacent the free end 24 of the ring 21 is slightly less than the thickness of the conduit to which the bushing is to be applied. The free end 24 of the ring 21 is preferably rounded in order that the bushing may more readily be applied to the conduit. The end 25 of the body 19 opposite to the flange 20 is preferably rounded or tapered to provide a smooth continuous inner wall for the conduit or bushing.

When the bushing of the modification shown in Figs. 3 and 4 is to be applied to the conduit 26 the end of the conduit is inserted in the channel 23 and the bushing is forced into the conduit until the end of the conduit reaches the flange 20 as shown in Fig. 3. In the operation of applying the bushing the end 24 of the ring 21 is stretched outwardly to widen the channel 23 and permit the conduit to pass therethrough. The resiliency of the ring 21 then provides a tight grip on the conduit once the bushing is in place.

While there are shown and described certain embodiments of the invention, it is understood that it is capable of many modifications. Changes, therefore in the construction and arrangement of the various parts and in the materials specified may be made without departing from the spirit and scope of the invention as proposed in the appended claims.

I claim:

1. An insulating bushing for electrical conduits and the like comprising a tubular body of resilient insulating material, and an outwardly extending annular flange of the same material at one end of the body, said flange being turned backwardly upon the body to form an annular ring extending about the body and spaced therefrom, the space between the body and the ring providing an annular channel for receiving the end of the conduit, the channel being of a width slightly less than the thickness of the conduit whereby the conduit is resiliently gripped by the ring and the body.

2. An insulating bushing for electrical conduits and the like comprising a tubular body of resilient insulating material, an outwardly extending annular flange of the same material at one end of the body, an annular ring extending about the body and spaced therefrom, said ring being joined to the outer periphery of said flange, the space between said ring and said body providing an annular channel for receiving the end of the conduit, said channel being of increasing thickness towards the end of the ring adjacent said flange the width of the channel at all portions thereof being less than the thickness of the conduit.

3. An insulating bushing for electrical conduits and the like comprising a tubular body of fabric-reinforced rubber, an outwardly extending annular flange of the same material at one end of the body, said flange being turned backwardly about the body to form an annular ring extending about the body and spaced therefrom, said ring being spaced from the body by a greater distance adjacent the flange than at the other end of the ring, the space between the body and the ring being adapted to provide a channel of a width slightly less than the thickness of the conduit for resiliently receiving and gripping the conduit.

FRANCIS ALLEN BUZZELL.